United States Patent
Zandvliet et al.

(10) Patent No.: US 12,285,131 B2
(45) Date of Patent: Apr. 29, 2025

(54) DRAINAGE CONNECTOR UNIT AND ASSEMBLY FOR THE DRAINAGE OF LIQUID WASTE OF BEVERAGE DISPENSING DEVICES

(71) Applicant: KONINKLIJKE DOUWE EGBERTS B.V., Utrecht (NL)

(72) Inventors: Nicolaas Wilhelmus Zandvliet, Leimuiden (NL); Koen Standaar, Soest (NL); Hendrik Johan Dees, Utrecht (NL)

(73) Assignee: KONINKLIJKE DOUWE EGBERTS B.V., Utrecht (NL)

( * ) Notice: Subject to any disclaimer, the term of this patent is extended or adjusted under 35 U.S.C. 154(b) by 1557 days.

(21) Appl. No.: 16/470,307

(22) PCT Filed: Dec. 19, 2017

(86) PCT No.: PCT/NL2017/050850
§ 371 (c)(1),
(2) Date: Jun. 17, 2019

(87) PCT Pub. No.: WO2018/117824
PCT Pub. Date: Jun. 28, 2018

(65) Prior Publication Data
US 2020/0008609 A1 Jan. 9, 2020

(30) Foreign Application Priority Data
Dec. 20, 2016 (NL) ........................................ 2018027

(51) Int. Cl.
*A47J 31/44* (2006.01)
*A47J 31/46* (2006.01)
(Continued)

(52) U.S. Cl.
CPC ........... *A47J 31/60* (2013.01); *A47J 31/4457* (2013.01); *A47J 31/46* (2013.01); *B01D 53/02* (2013.01); *B01D 2253/102* (2013.01)

(58) Field of Classification Search
CPC .... B01D 2253/102; B01D 53/02; A47J 31/60; A47J 31/4457
See application file for complete search history.

(56) References Cited

U.S. PATENT DOCUMENTS 4,222,711 A * 9/1980 Mayer ................... F04D 13/068
417/36
4,621,571 A * 11/1986 Roberts ................... A47J 31/46
99/305

(Continued)

FOREIGN PATENT DOCUMENTS

| CN | 201906613 | 7/2011 |
| CN | 202184630 U | 4/2012 |

(Continued)

OTHER PUBLICATIONS

International Search Report and Written Opinion, PCT/NL2017/050850, Koninklijke Douwe Egberts B.V. (Mar. 27, 2018).

*Primary Examiner* — Steven W Crabb
*Assistant Examiner* — Lawrence H Samuels
(74) *Attorney, Agent, or Firm* — Fitch, Even, Tabin & Flannery LLP

(57) ABSTRACT

Drainage connector unit and assembly for the drainage of liquid waste of beverage dispensing devices A dispensing and drainage assembly (1) and a drainage connector unit (13) for drainage of liquid waste of beverage dispensing devices. The assembly (1) comprises a beverage dispensing device (3) with a leak receptacle (5), a drain container (17), and the drain connector unit (13). The drain connector unit (13) comprises a housing (23) for cooperating with an opening to the drain container (17) for collecting liquid (Continued)

Figure 1:
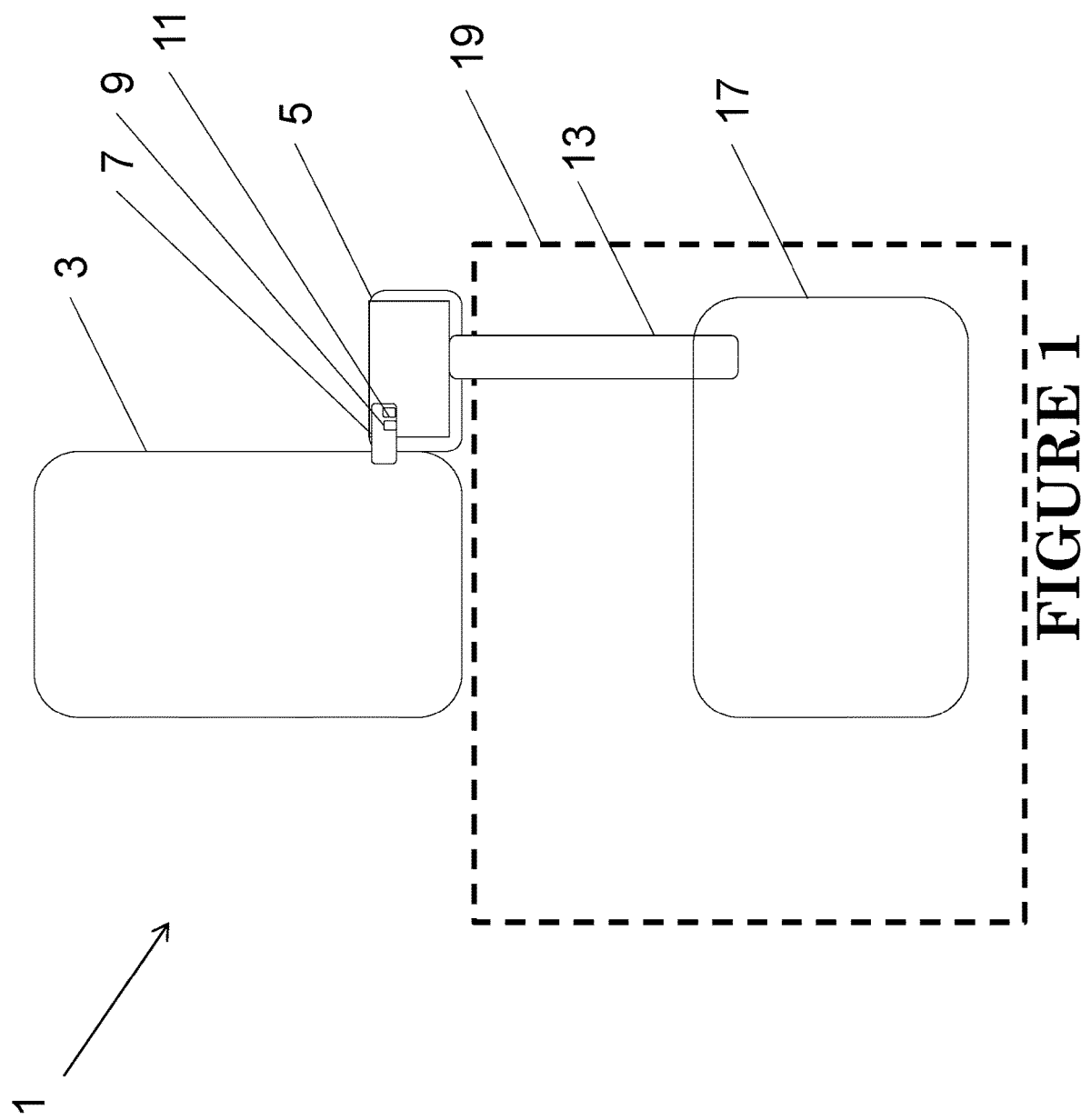

waste from a dispensing device. Additionally the drain connector unit (13) comprises a drain channel (15). The drain channel (15) extends through the housing (23) for guiding liquid waste there through from a leak receptacle (5) of the dispensing device (3), to the drain container (17). The drain connector unit (13) further also comprises at least a first aroma barrier (29) interposed between a first opening (25) and a second opening (27) in the housing (23). The first opening (25) is arranged for interacting with a headspace of the drain container (17) and the second opening (27) is arranged for interacting with a gas atmosphere outside of the drain container (17).

26 Claims, 6 Drawing Sheets

(51) Int. Cl.
*A47J 31/60* (2006.01)
*B01D 53/02* (2006.01)

(56) References Cited

U.S. PATENT DOCUMENTS

| | | | | |
|---|---|---|---|---|
| 4,969,217 A * | 11/1990 | Gandini | ............... | E03C 1/232 4/686 |
| 5,245,915 A | 9/1993 | Ford | | |
| 5,303,639 A * | 4/1994 | Bunn | ............... | A47J 31/002 99/289 R |
| 5,372,728 A * | 12/1994 | Midden | ............... | B01D 29/6476 426/433 |
| 5,611,261 A * | 3/1997 | Pope | ............... | A47J 31/60 99/290 |
| 6,106,705 A * | 8/2000 | Giordano | ............... | C02F 9/20 73/861.78 |
| 6,491,814 B1 * | 12/2002 | Wheeler | ............... | E03C 1/264 4/294 |
| 10,337,179 B2 * | 7/2019 | McAlpine | ............... | E03C 1/232 |
| 2002/0070238 A1 * | 6/2002 | Pritchett | ............... | B05B 7/0037 222/189.11 |
| 2005/0133459 A1 * | 6/2005 | Schulz | ............... | C02F 9/20 210/256 |
| 2006/0151381 A1 * | 7/2006 | Wennerstrom | ............... | C02F 1/003 210/464 |
| 2007/0079707 A1 * | 4/2007 | Noordhuis | ............... | A47J 31/0668 99/275 |
| 2008/0250935 A1 * | 10/2008 | Van Belleghem | ............... | A47J 31/0642 99/289 R |
| 2010/0024120 A1 * | 2/2010 | Coronado | ............... | F16L 55/07 4/679 |
| 2011/0284479 A1 * | 11/2011 | O'Brien | ............... | C02F 1/002 210/764 |
| 2015/0021361 A1 * | 1/2015 | Werbner | ............... | C12H 1/22 141/2 |
| 2015/0374169 A1 * | 12/2015 | Salas-de la Cruz | ............... | C02F 1/002 99/290 |
| 2017/0167804 A1 * | 6/2017 | MacKelvie | ............... | F28D 21/0012 |

FOREIGN PATENT DOCUMENTS

| | | | |
|---|---|---|---|
| CN | 103631279 A * | 3/2014 | |
| EP | 1 772 081 A1 | 4/2007 | |
| RO | 108991 B1 * | 10/1994 | |
| WO | WO 2013/087607 A2 | 6/2013 | |

\* cited by examiner

DRAINAGE CONNECTOR UNIT AND ASSEMBLY FOR THE DRAINAGE OF LIQUID WASTE OF BEVERAGE DISPENSING DEVICES

CROSS-REFERENCE TO RELATED APPLICATIONS

This application is a National Stage Application of PCT/NL2017/050850, filed Dec. 19, 2017, which claims the benefit of and priority to Netherlands Patent Application No. 2018027, filed Dec. 20, 2016, the entire contents of both of which are hereby incorporated by reference.

The invention relates to providing beverage dispensing devices with drainage options where facility drainage possibilities are limited or absent.

Beverage dispensing devices are commonly connected to a facility drainage, such that drain fluids, such as spills or other dispensed fluids are carried away via the facility drainage to sewers. Other dispensed fluids are often consumer rejected beverages or spills, and fluids from flushing or cleaning parts of the beverage dispenser. For coffee machines in particular hygiene is of the greatest importance. Coffee machines often clean themselves by flushing dispensing parts with cleaning fluids, such as water, to prevent bacteria growth inside the machines. Beverage dispensing devices, and coffee machines, therefor require to be connected to a facility drainage as to prevent the accumulation of drainage near the device, which would otherwise compromise hygienic operation thereof.

A problem is that to connect a beverage dispensing device to a facility drainage there needs to be access to such facility drainages at the location that is selected for the beverage dispensing device. Often however this requires inconvenient renovations to an existing facility drainage network. The latter also ads substantially to the cost. Accordingly, the placement of the beverage dispensing device is limited by the presence of facility drainage or the ability or finance to provide access thereto. Often a beverage dispensing device is trialed prior to purchase or rental. The previously mentioned costs for renovations and placement limitations therefor often result in placement of a beverage dispensing device without access to facility drainage. Often such beverage dispensing devices are provided with a holding receptacle, such as a drip tray. The drip trays enjoys a rather limited volume. Often the drip tray only holds the volume of two or three consumptions. As such, dispensing often needs to be interrupted in order to allow for emptying and cleaning of the drip tray. In many beverage dispensing devices a bucket may be provided nearby to locally empty the drip tray, often by hand. The local accumulation of drain fluid becomes an inevitability in absence of facility drainage. In case of neglect this is known to compromise the hygienic use of the beverage dispensing device. Spread of microbes becomes a concern as microbial growth is often unchecked in areas where such drain fluids are collected. Microbial growth is additionally accompanied by unpleasant smells originating from fungal spores and decay of dispensed product.

Therefor there exists a need to store drain fluids of a beverage dispensing device locally without compromising the hygienic use of the device, and without a need to have access to fixed drain facilities.

Accordingly, it is an object of the present invention to propose a drainage connector unit and assembly for the drainage of liquid waste. In a more general sense it is thus an object of the invention to overcome or reduce at least one of the disadvantages of the prior art. It is also an object of the present invention to provide alternative solutions which are less cumbersome in assembly and operation and which moreover can be made relatively inexpensively. Alternatively it is an object of the invention to at least provide a useful alternative for current practices.

To this end the invention provides for a drain connector unit, and a dispensing and drainage assembly as defined in one or more of the appended claims. According to a first aspect of the invention a drainage connector unit which comprises a housing. The housing is arranged for cooperating with an opening to a drain container for collecting drainage from a dispensing device. Additionally the drainage connector unit comprises a drain channel for guiding fluids there through from a leak receptacle of the dispensing device, to the drain container. The drainage connector unit also at least comprises a first aroma barrier interposed between a first opening and a second opening on the housing. The first opening is arranged for interacting with the headspace of the drain container and the second opening is arranged for interacting with a gas atmosphere outside of the drain container. The drain container can be jerry can with an opening in which the connector is placeable. The first aroma barrier can here also be arranged to limit migration of microbes such as spores, for example through adsorption common in filters with large microscopic surface areas. Large microscopic surfaces can be microscopic surfaces such as associated with active carbon, 500-3000 $m^2$ per gram.

Optionally, the drain channel is formed by a flexible tube. It will be appreciated that the drain channel, also separate from this example extends through the housing and could in practice also in part be formed by a part of the housing when the flexible tube does not extend all the way through the housing.

Optionally, the drain further comprises a fluid level sensor arranged for providing a signal when collected drainage fluid reaches a predefined level in the drain container. Often drain containers, such as jerry cans, are placed inside a cupboard or otherwise out of sight. Additionally, a general neglect to check the amount of gathered fluid in the drain container may lead to an overflow of the drain container. The latter can be prevented with the fluid level sensor.

Optionally, the fluid level sensor comprises a first and a second conduction element. The predefined level in the drain container is detected by means of conduction of electricity between the at least first and second conduction element via a conductive medium. The conductive medium can be the liquid itself or a sufficiently conductive floater element. A benefit of this option is that this requires few to no moving parts. This increases reliability and prevents jamming of a sensor due to build up of drain materials.

Optionally, the first and second conduction elements are partially or fully recessed in the housing. A benefit of this option is that the housing acts as a protective casing around the sensor elements, preventing the precipitation of sediments on the sensor elements along their entire functional length and reducing corrosion. The latter will increase the reliability of detection over a longer period of time. Additionally, the housing protects the sensor against damage which may occur from mishandling or dropping of the connector unit.

Optionally, the first and second conduction element are metal rods, such as stainless steel alloys. A benefit is that their conductivity and sturdiness over their length is guaranteed. The latter is useful in case of a the connector unit is dropped, in which often the sensor and its components are easily damaged. Furthermore, stainless steel metal rods are resistant against corrosion which may occur under the, often inhospitable, conditions in de drain container.

Optionally, the fluid level sensor is arranged to form an extension of an electrical detection circuit formed by a conductive level controller in the leak receptacle. To this end the fluid level sensor comprises a conductive extension. The conductive extension is communicatively connectable to an electrical detection circuit. The electrical detection circuit is formed by a conductive level controller to the leak receptacle. A benefit of this option is that the fluid level sensor acts as a sensor within a sensor, making use of an existing electronic infrastructure often inherent to beverage dispensing devices for detecting if a drip tray is filled.

Optionally, the conductive level controller comprises at least a first and second probe electrode. The fluid level sensor comprises at least a first and second electrode. The conductive extension comprises at least a first and second conductive cable, arranged to connect the first probe electrode to the first electrode and the second probe electrode to the second electrode. It will be appreciated that here each probe electrode in the leak receptacle is in electrical communication with an electrode in the drain container. In one example such an conductive extension is formed by a conductive wire, which is isolated along its length to form a cable. The conductive wire can be metal, such as copper or an alloy thereof. The conductive wire can at one end be provided with a magnet or conductive clip for connecting the conductive wire to a first electrode of the conductive level controller. A benefit is that this allows for both the detection of a full drain container and a full leak receptacle. This allows the beverage dispensing device to prevent dispensing in the event of a drainage clog or full drain container.

Optionally, the first aroma barrier or filter comprises a plurality of filter parts. Each of the plurality of filter parts are of a same composition. A benefit is that this allows each part of the filter to be replaced separately. Also, the filer can be more easily removed from the housing as upon removal only each part of the filter needs to be accessible for the replacement thereof.

In one example, the filter can be placed around a part of the drain channel. The filter is than more easily replaced or removed if it can be taken in separate halves or parts rather than having to be placed around the end of an often contaminated drain channel to be moved into its working position within the housing.

Optionally, the drain channel is arranged for being in fluid connection with a second aroma barrier. It will be appreciated that a fluid inside the drain channel is here also considered to be in fluid connection with the drain channel. A benefit is that migration of odors through the drain channel is prevented.

Optionally, the first aroma barrier or filter is provided as a path of least resistance for relieving pressure differences between the headspace of the drain container and the gas atmosphere outside of the drain container. In case of the absence of a second aroma barrier a benefit is that this allows for an open connection between the drain container and the leak receptacle with reduced migration of smells and microbes via the drain channel. In particular in small offices it is possible that a coffee machine stays unused over a holiday period. During such a period it is possible for a second aroma barrier, such as a liquid in a syphon when incorporated in the drain channel, to dry out and become ineffective. A benefit is here that even in extended periods of non-use hygiene can be maintained.

In the case of a second aroma barrier a benefit is that pressure differences between a drain container and the environment can equalize themselves through the first aroma barrier or filter without effecting the second aroma barrier. The combined use of first and second aroma barriers further increases the effectiveness of each of the barriers. Additionally, bubbling of gas through the second aroma barrier is prevented. This reduces noise and odors.

Optionally, the filter forming the first aroma barrier therefor can be provided as a low-air-resistance-carbon-filter, which is a name for active carbon filters such as used in cooker hoods.

Optionally, a part of the drain channel is provided with or as a syphon-shape, such that the second aroma barrier is formed in the syphon-shape by a retained liquid. A benefit is that the second aroma barrier can be refreshed by liquids which have been more recently dispensed.

Optionally, the aroma barrier is provided as an adsorption filter. A benefit is that in this manner volatile components are retained and can be removed together with the filter. While additionally, the filter may even be regenerated for reuse.

Optionally, the first aroma barrier is a carbon filter. It will be appreciated that the carbon filters is an activated carbon filter. A benefit is that the activated carbon filter remains functional for filtering volatile components even in warm and humid conditions in enclosed spaces, such as cupboards.

Optionally, the drain connector unit comprises a union nut for providing an air tight seal between the housing and the opening to the drain container. A benefit is that this prevents the spilling of gasses in the drain container to the environment.

Optionally, the union nut is a screwcap-type union nut provided as a skirt along a circumference of the housing arranged to engage a screw threaded opening to the drain container. A benefit is that this allows for rapid and intuitive manual positioning and fastening of the drain connector unit to the drain container.

Optionally, the drain connector unit comprises a retaining element arranged to cooperate with the opening to the drain container to hold the housing in place. The retaining element can be a retaining ring. This prevents the accidental detachment of the drain connector unit from the drain container if either is shifted or displaced. In cooperation with a union nut the retaining element can provide a fail safe for when the union nut was forgotten.

Optionally, the drain channel has an inner diameter of 5-10 mm. A benefit is that this prevents capillary activity such that no liquid remains stagnant in the drain channel other than any liquid intended to form the second aroma barrier. This prevents bacterial migration in the drain channel. Additionally, the inner diameter is such that liquid flow through the drain channel will be a laminar flow while also preventing bubbles to move up through the drain channel counter to the flow. This helps the drainage being relatively silent.

Preferably, the drain channel has an inner diameter of 7.5-8.5 mm. A benefit is that this diameter allows for the silent and nearly instant drainage of larger bodies of liquid, such as a full cup volume of coffee. This allows the user to spill coffee without a problem of overflow or noise due to bubbling or a temporary stagnation of spilled liquid in the leak receptacle.

Optionally, the first aroma barrier or filter is provided with a central bore through which the drain channel and a part of the fluid level sensor extend. A benefit is that escaping gasses which would otherwise pass along fluid sensor parts or bypass the drain channel will always encounter the aroma barrier or filter. The resulting drain connecter is better suited to handle gas leaks and is furthermore more compact in its construction. This allows the drain connector to be more compact and be more easily handed due to its reduced size.

Optionally, the first aroma barrier or filter forms a disk with a volume of 5-20 cm$^3$.

Optionally, the first aroma barrier or filter forms a disk with a volume of 14-15 cm$^3$.

Optionally, the first aroma barrier or filter forms a disk, wherein the disk is provided with a recess for accommodating or guiding the drain channel. It will be appreciated that the recess can form a central bore or that the recess can stretch along the surface of the disk. A benefit is that this prevents the pinching of the drain channel in the housing.

Optionally, the housing comprises a first and a second mutually connectable injection molded housing part. This allows for ease of assembly, deconstruction of the drain connector and ease of access to components inside the housing.

Optionally, the first and second housing part are symmetrical along a longitudinal central axis of the housing. A benefit is that the user may easily anticipate the shape of the drain connector which eases connection itself and handling.

Optionally, the drain connector unit comprises a protection sleeve. The protection sleeve is arranged for protecting at least a part of the drain channel that stretches between the housing and the leak receptacle. A benefit of the protection sleeve is also to contain any leaks of the drain channel to a further space which exists between the protection sleeve and the drain channel.

According to a further aspect of the invention there is provided a drainage assembly for drainage of liquid waste of beverage dispensing devices. The assembly comprises a beverage dispensing device with a leak receptacle. The assembly further comprises a drain container. The assembly further also comprises a drain connector unit. The drain connector unit comprises a housing for cooperating with an opening to a drain container for collecting drainage from the beverage dispensing device. The drain connector unit further comprises a drain channel extending through the housing for guiding fluids there through from the leak receptacle of the dispensing device, to the drain container. Additionally, the drain connector unit comprises a first aroma barrier interposed between a first opening and a second opening on the housing. The first opening is arranged for interacting with a headspace of the drain container and the second opening is arranged for interacting with a gas atmosphere outside of the drain container.

Optionally, the drainage assembly is provided with a drain connector according to the first aspect of the invention.

Figure 2:
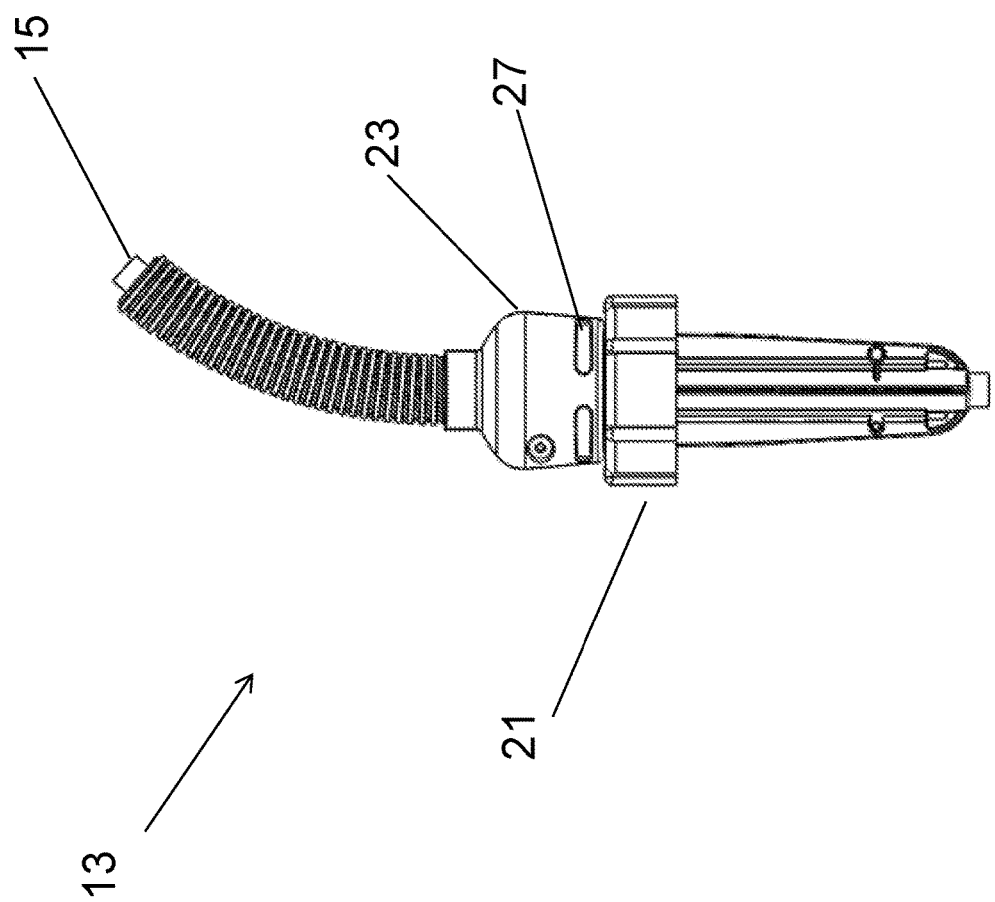
Figure 3:
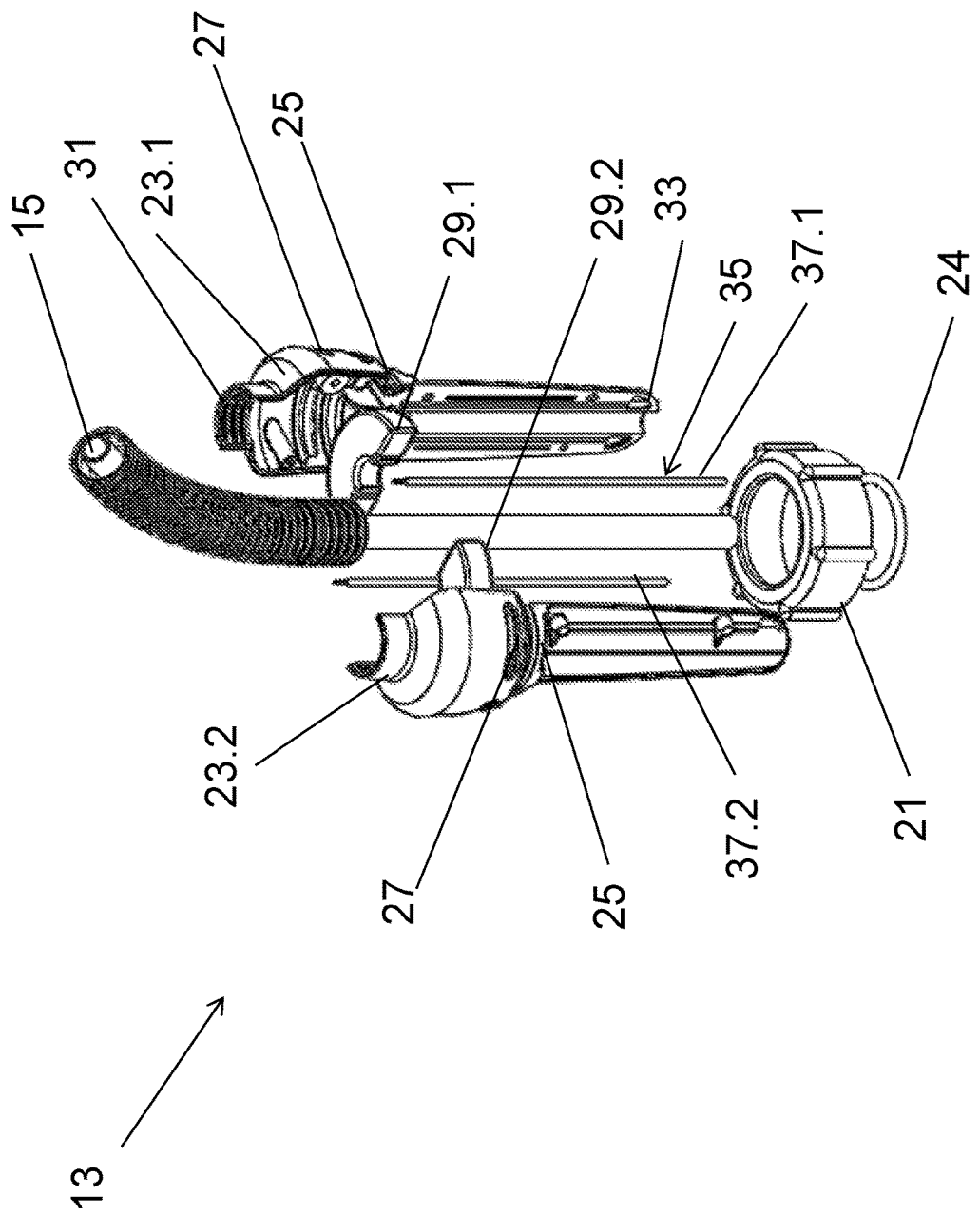
Figure 4:
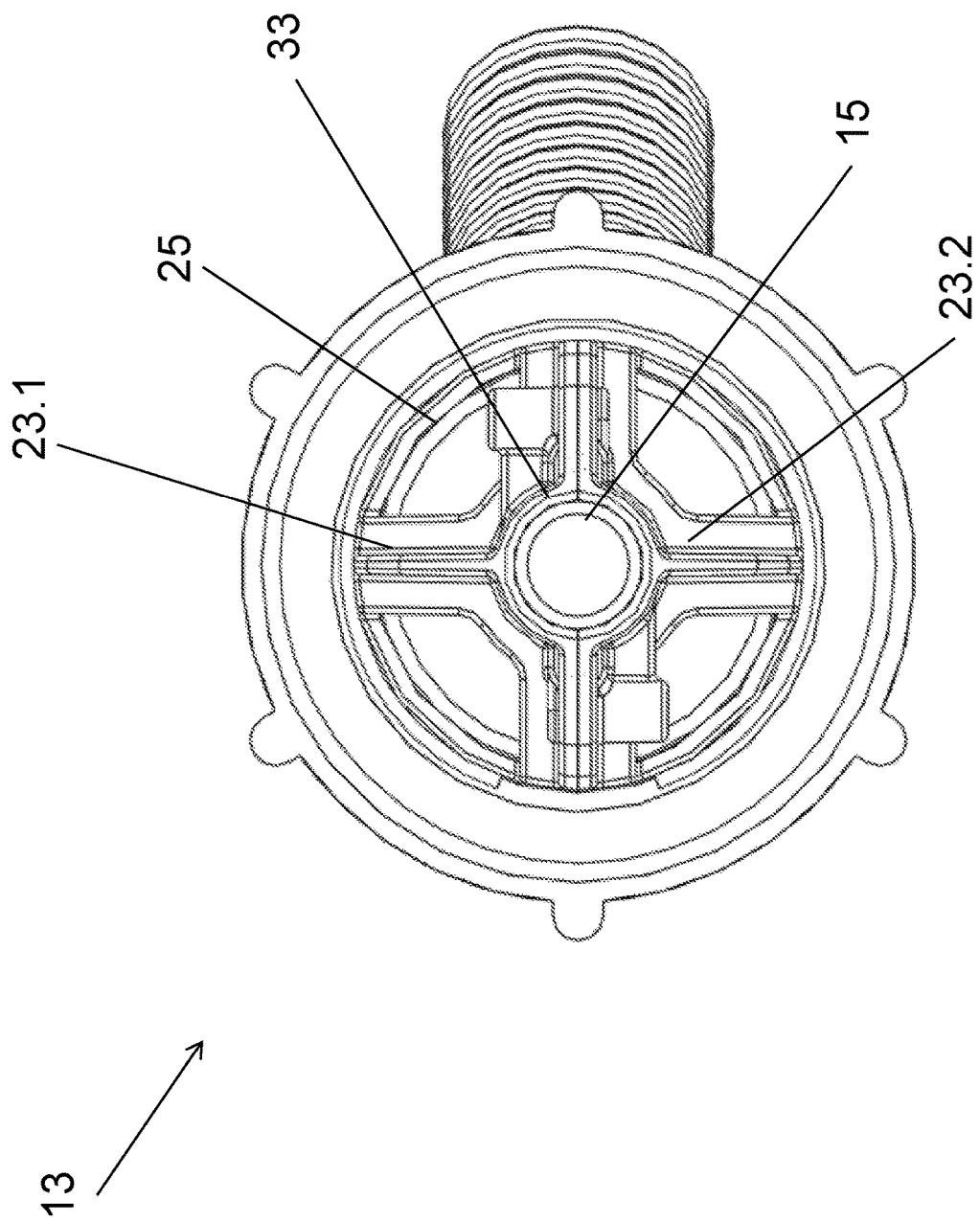
Figure 5:
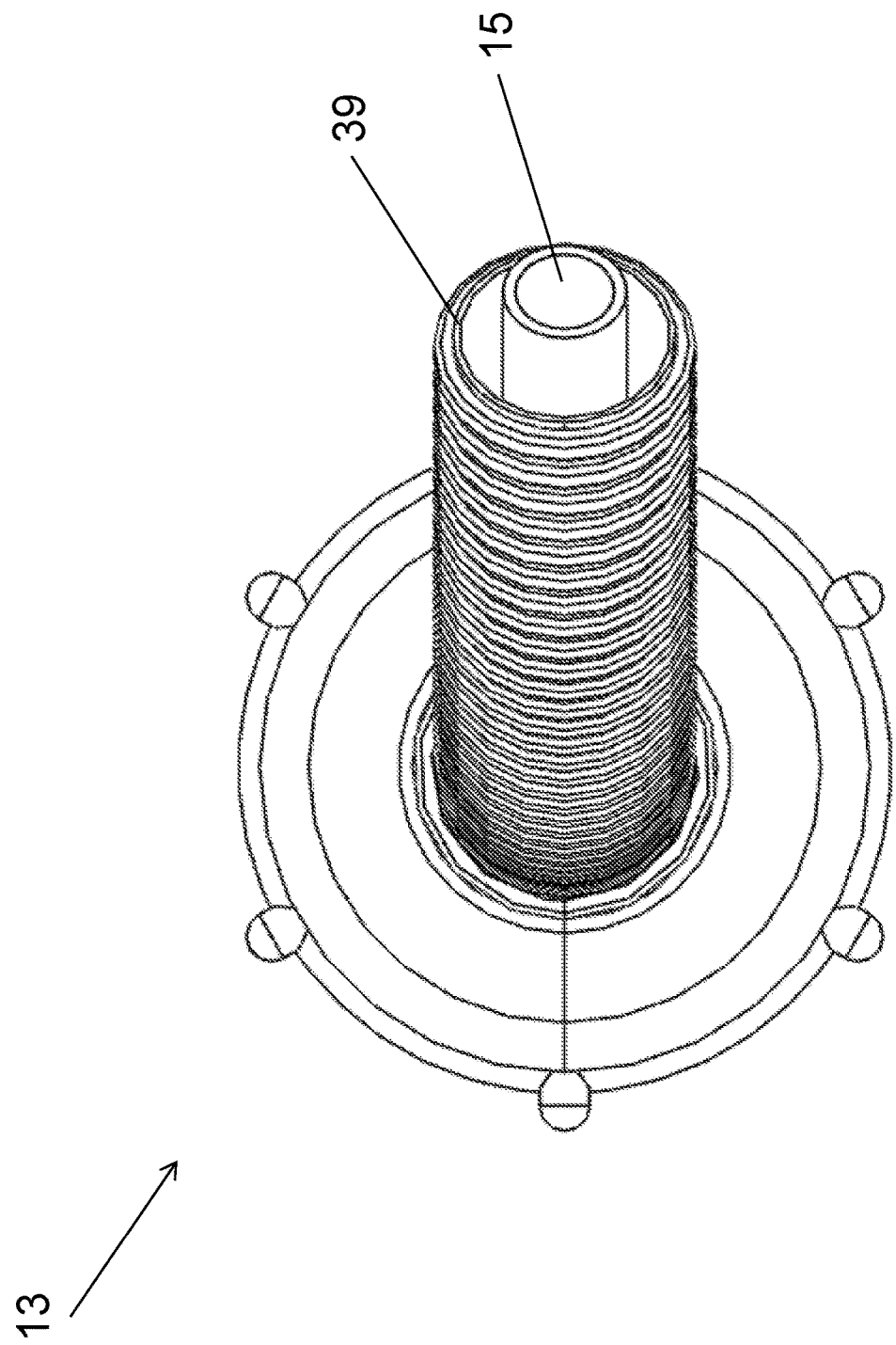
Figure 6:
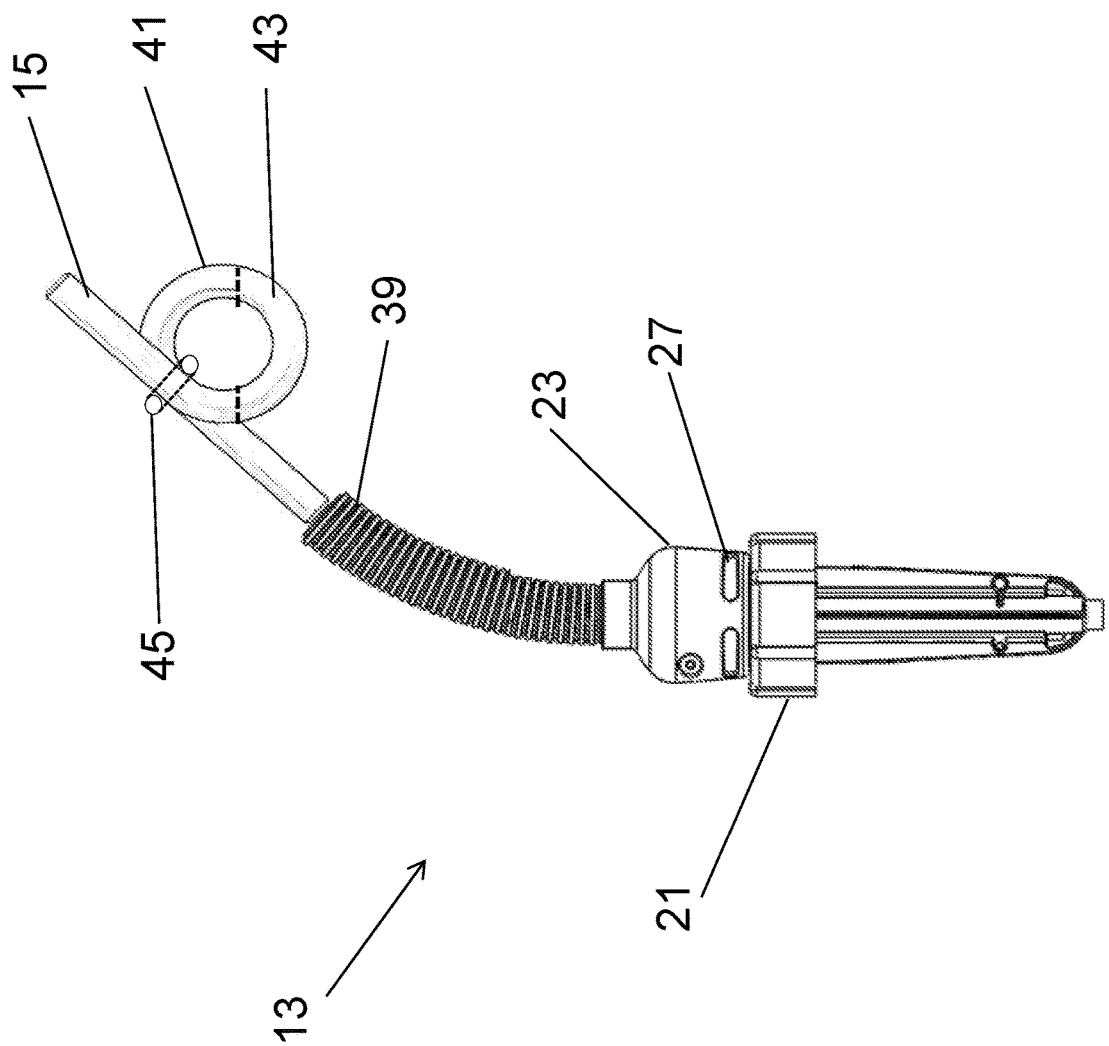

Additional advantageous aspects of the invention will become clear from the appended description and in reference to the accompanying drawings, in which:

FIG. 1 is a schematic overview of a drainage assembly;
FIG. 2 is a partial side view of a drainage connector unit;
FIG. 3 is an exploded view of a drainage connector unit;
FIG. 4 is a partial bottom view of the drainage connector;
FIG. 5 is a partial top view of the drainage connector; and
FIG. 6 is another partial side view of the drainage connector unit.

In FIG. 1 a dispensing and drainage assembly 1 is shown to have a beverage dispensing device 3 which has connected thereto a leak receptacle 5. The beverage dispensing device 3 in this example is a coffee machine. Any spilled fluids are collected in the leak receptacle 5. Leak receptacle 5 is a leaking tray such as commonly present in known coffee machines. The leak receptacle 5 here provides a limited fluid capacity which can hold either a single spilled beverage or at best a very limited number of beverage spillings. The leak receptacle 5 is provided with a conductive level controller 7 having a first and second probe-electrodes 9, 11 in the leak receptacle 5 as a sensor in the leak receptacle 5. When the beverage dispensing device 3 is not part of the drainage assembly 1 the conductive level controller 7 is arranged to detect a full leak receptacle 5 and is communicatively connected to the dispensing device 3 to prevent dispensing if a full leak receptacle 5 is detected. A drain connector unit 13 is connected to the leak receptacle 5 by means of a drain channel 15, shown in FIG. 2. The drain channel 15 guides fluids under the force of gravity to a drain container 17 and is a plastic drain tube. The drain container 17 is here a jerry can which is held inside a cupboard 19 separate from the dispensing device 3. In the assembly the drain container 17 has no other openings other than a screw threaded mouthpiece (not shown, but customary). When the beverage dispensing device 3 is part of the drainage assembly 1 the conductive level controller 7 would generally not be used to detect a full leak receptacle 5 as any liquids are drained to the drain container 17. As such, the leak receptacle will not become full. It will be appreciated however that an exception to this would be any situation in which draining of the leak receptacle 5 is prevented, such as in the event of a clogged drain channel 15.

In FIG. 2 a partial side view of the drain connector unit 13 is shown. Here a screwcap-type union nut 21 can be seen. The union nut 21 skirts a housing 23 and encircles it. The union nut 21 is freely rotatable around a predefined part of the housing 23. In the assembly 1 the union nut 21 has engaged the mouthpiece of the jerry can 17 to provide an air tight seal between the housing 23 and the mouthpiece, this is facilitated by a rubber or elastomer sealing ring 24. The mouthpiece also forms an opening to the drain container 17. In this example, the drain channel 15 is directly connected to a drain unit, such as a drain nozzle (not shown but customary), which is part of the leak receptacle 5. The drain channel 15 at its connecting end is fitted around the drain nozzle and fixed with a tie-wrap or the like.

In FIG. 3 an exploded view of the drain connecter unit 13 is shown. Here it can be seen that the housing 23 comprises first and second axially symmetrical housing halves 23.1, 23.2. The first and second housing halves can be fastened together by means of fastening means such as screws. The housing halves 23.1, 23.2 are fastened to establish a gas tight seal between the housing halves 23.1, 23.2. The housing 23 has first openings 25 and second openings 27 on each of the symmetrical housing halves. In the assembly 1, the first openings 25 are in fluid communication with the drain container 17 and the second openings 27 are in fluid communication with the air inside the cupboard 19. Interposed between the first and second openings 25, 27 is an aroma filter 29. The aroma filter has two symmetrical parts 29.1, 29.2 which reside in each of the housing halves 23.1, 23.2. The filter 29 in its entirety forms a disk with a central borebore in its center. The drain channel 15 extends from a third opening 31 in the housing 23 to a fourth opening 33 and through the central bore of the filter 29. The housing houses first and second electrodes 37.1, 37.2 of a fluid level sensor 35. To each of the electrodes 37.1, 37.2 a conductive cable (not shown, but customary) is conductively connected, which cable is electrically isolated over its length with the exception of its ends. Each of the conductive cables extends along the drain channel 15 to the leak receptacle 5. Each of the conductive cables is connected to a different probe-electrode 9, 11 by means of metal clips or like electrical connecting means. The first and second electrodes 37.1, 37.2 thereby form conductive extensions of the probe-electrodes 9, 11 of the beverage dispensing device 3. The conductive level controller 7 thereby is arranged to detect a full drain container 17 as if it were a full leak receptacle 5. The conductive level controller 7 will prevent the dispensing device 3 from dispensing any further when the drain container 17 is detected to be full.

In FIG. 4 a partial bottom view of the drainage connector unit 13 is shown. Note that the union nut 21, and the first and second electrodes 37.1, 37.2 are deleted for clarity. The first opening 25 is concentric with the drain channel 15. It will be appreciated that the first and second openings 25, 27 can, different from this example, also be understood as an area on the housing in which a plurality of sub openings exist.

In FIG. 5 a partial top view of the drainage connector unit 13 is shown. Note that the conductive cables are deleted for clarity. However, the conductive cables extend along the drain channel 15 inside a protection sleeve 39. The protection sleeve 39 is a flexible plastic tube with a harmonica profile. Also the first opening 25 via the aroma filter 29 is in communication with the elongate passage formed between the protection sleeve 39 and the chain channel 15. This allows the protection sleeve 39 to shorten and extend as desired covering the drain channel along its entire length.

In FIG. 6 a partial side view of the drainage connector unit 13 is shown. The drain channel 15 here is curled to form a syphon 41. The curling of the chain channel is maintained by a fixating element 45, such as a cable binder, tie-wrap, tube clamp. It is also possible for the sleeve 39 to extend along the syphon 41. In such a case the fixating element fixates the sleeve in a curled shape. Liquid waste here forms a second aroma barrier 43 in the drain channel 15 during use.

Accordingly there is disclosed a dispensing and drainage assembly 1 and a drainage connector unit 13 for drainage of liquid waste of beverage dispensing devices. The assembly 1 comprises a beverage dispensing device 3 with a leak receptacle 5, a drain container 17, and the drain connector unit 13. The drain connector unit 13 comprises a housing 23 for cooperating with an opening to a drain container for collecting liquid waste from a dispensing device. Additionally the drain connector unit 13 comprises a drain channel 15. The drain channel 15 extends through the housing 23 for guiding liquid waste there through from a leak receptacle 5 of the dispensing device 3, to the chain container 17. The drain connector unit 13 further also comprises at least a first aroma barrier 29 interposed between a first opening 25 and a second opening 27 on in the housing 23. The first opening 25 is arranged for interacting with the a headspace of the drain container 17 and the second opening 27 is arranged for interacting with a gas atmosphere outside of the drain container 17.

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' are not to be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extend that structure, material, or acts are considered to be essential they are inexpressively indicated as such. Additions, deletions, and modifications within the purview of the skilled person may generally be made without departing from the scope of the invention, as determined by the claims.

The invention claimed is:

1. A drain connector unit for drainage of liquid waste of a beverage dispensing device with a leak receptacle, the drain connector unit comprising:
   a housing coupled to a drain container via an opening of the drain container for collecting liquid waste from the dispensing device;
   a drain channel extending from the leak receptacle of the dispensing device, to the drain container, the drain channel passing through an interior of the housing; and
   at least a first aroma barrier placed around a part of the drain channel and interposed between a first opening and a second opening on the housing, which first aroma barrier is provided as an adsorption filter, and wherein the first opening is arranged for interacting with a headspace of the drain container and the second opening is arranged for interacting with a gas atmosphere outside of the drain container, the first aroma barrier being located exteriorly relative to and around the drain channel and interiorly relative to the housing.

2. The drain connector unit according to claim 1, wherein the drain channel comprises a flexible tube.

3. The drain connector according to claim 2, wherein the fluid level sensor comprises at least a first and second conduction element, wherein the predefined level in the drain container is detected by means of conduction of electricity between the at least first and second conduction element via a conductive medium.

4. The drain connector unit according to claim 3, wherein the at least first and second conduction element are at least partially recessed in the housing.

5. The drain connector according to claim 3, wherein the at least first and second conduction element are metal rods.

6. The drain connector unit according to claim 1, further comprising a fluid level sensor arranged for providing a signal when collected liquid waste reaches a predefined level in the drain container.

7. The drain connector unit according to claim 6, wherein the fluid level sensor comprises a conductive extension, wherein the conductive extension is connectable to an electrical detection circuit, wherein the electrical detection circuit is formed by a conductive level controller to the leak receptacle.

8. The drain connector unit according to claim 7, wherein the conductive level controller comprises at least a first and second probe electrode, wherein the fluid level sensor comprises at least a first and second electrode, and wherein the conductive extension comprises at least a first and second conductive cable arranged to connect the first probe electrode to the first electrode and the second probe electrode to the second electrode.

9. The drain connector unit according to claim 1, wherein the first aroma barrier comprises of a plurality of filter parts, wherein each of the plurality of filter parts are of a same composition.

10. The drain connector unit according to claim 1, wherein the first aroma barrier is provided as a path of least resistance for relieving pressure differences between a headspace of the drain container and the gas atmosphere outside of the drain container.

11. The drain connector unit according to claim 1, wherein the drain channel is arranged for being in fluid connection with a second aroma barrier.

12. The drain connector unit according to claim 11, wherein a part of the drain channel is as associated with a syphon, configured to form the second aroma barrier the syphon by a volume of retained liquid.

13. The drain connector unit according to claim 1, wherein the first aroma barrier is a carbon filter.

14. The drain connector unit according to claim 1, comprising a union nut arranged for providing an air tight seal between the housing and the opening to the drain container.

15. The drain connector unit according to claim 14, wherein the union nut is a screwcap-type union nut provided as a skirt along a circumference of the housing arranged to engage a screw threaded opening to the drain container.

16. The drain connector unit according to claim 1, comprising a retaining element arranged to cooperate with the opening to the drain container to hold the housing in place.

17. The drain connector unit according to claim 1, wherein the drain channel has an inner diameter of 5-10 mm.

18. The drain connector unit according to claim 17, wherein the drain channel has an inner diameter of 7.5-8.5 mm.

19. The drain connector unit according to claim 1, further comprising a fluid level sensor arranged for providing a signal when collected liquid waste reaches a predefined level in the drain container, wherein the first aroma barrier is provided with a central bore through which the drain channel and a part of the fluid level sensor extend.

20. The drain connector unit according to claim 1, wherein the first aroma barrier forms a disk with a volume of 5-20 $cm^3$.

21. The drain connector unit according to claim 20, wherein the first aroma barrier forms a disk with a volume of 14-15 $cm^3$.

22. The drain connector unit according to claim 1, wherein the first aroma barrier is provided with a recess to guide or accommodate a part of the drain channel.

23. The drain connector unit according to claim 1, wherein the housing comprises a first and a second mutually connectable injection molded housing part.

24. The drain connector unit according to claim 23, wherein the first and second housing part are symmetrical along a longitudinal central axis of the housing.

25. The drain connector unit according to claim 1, further comprising a protection sleeve arranged for protecting at least a part of the drain channel stretching between the housing and the leak receptacle.

26. A dispensing and drainage assembly for drainage of liquid waste of beverage dispensing devices, the dispensing and drainage assembly comprising
a beverage dispensing device with a leak receptacle;
a drain container; and
a drain connector unit according claim 1.

* * * * *